UNITED STATES PATENT OFFICE.

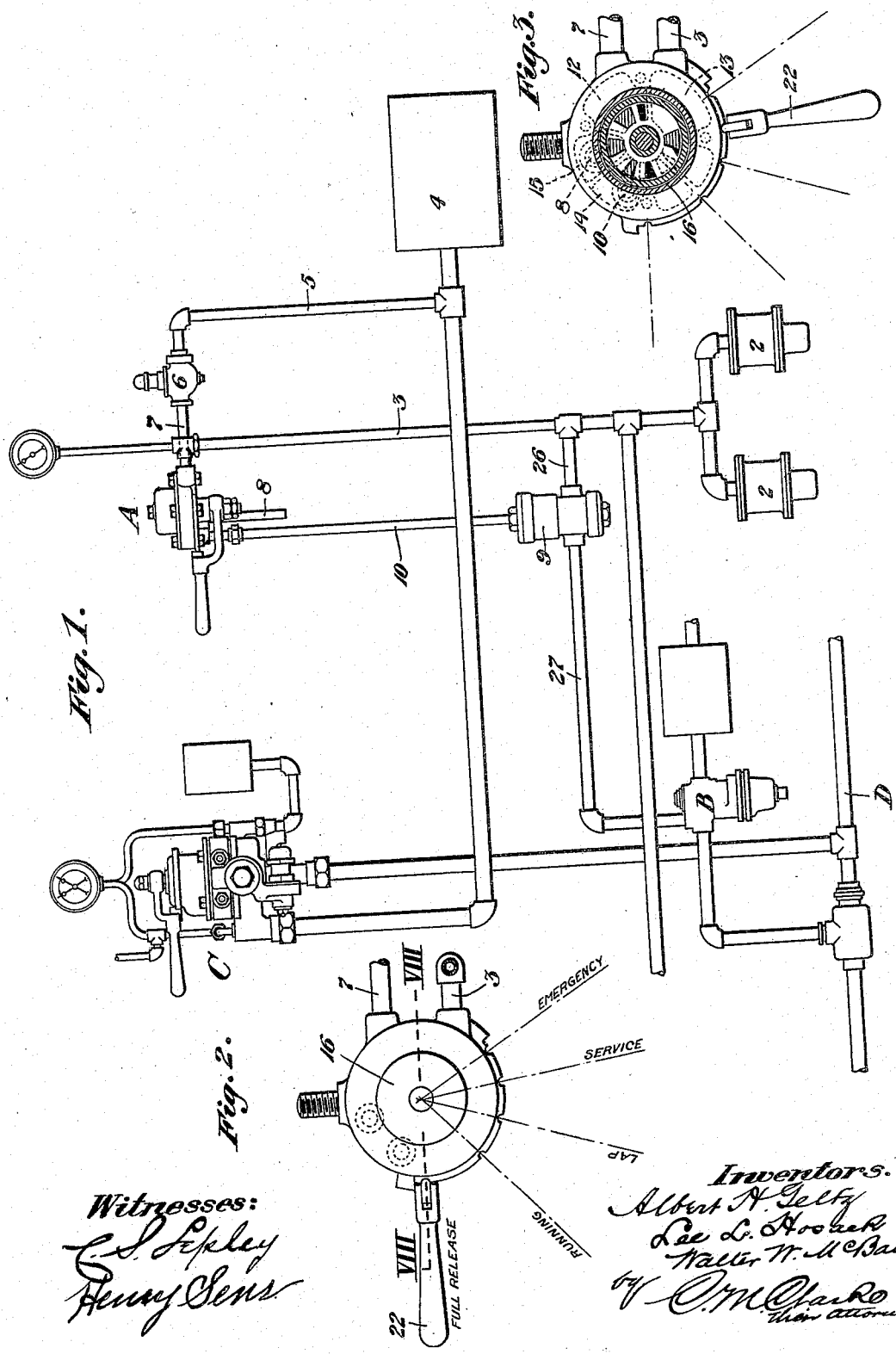

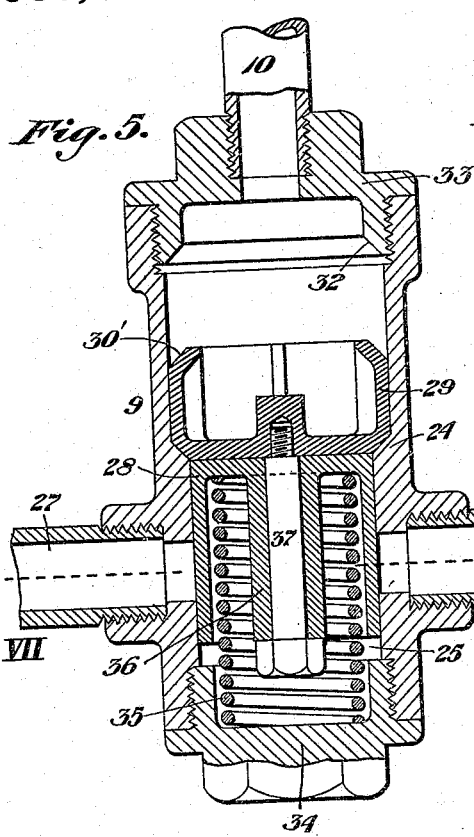
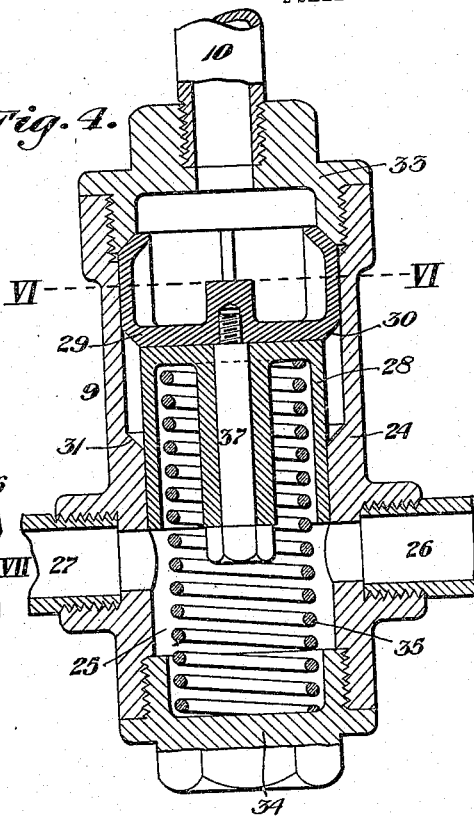
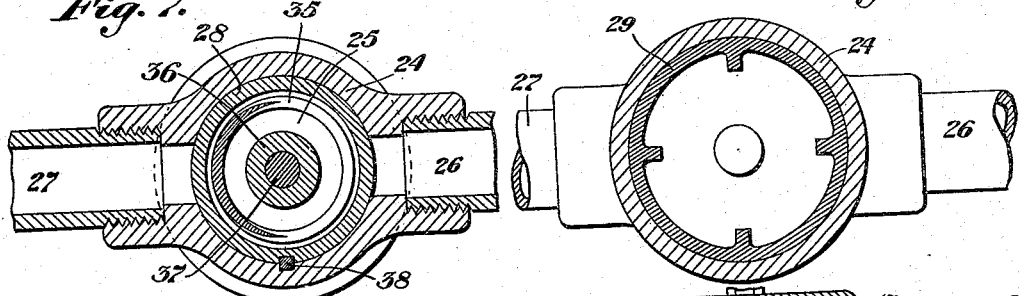
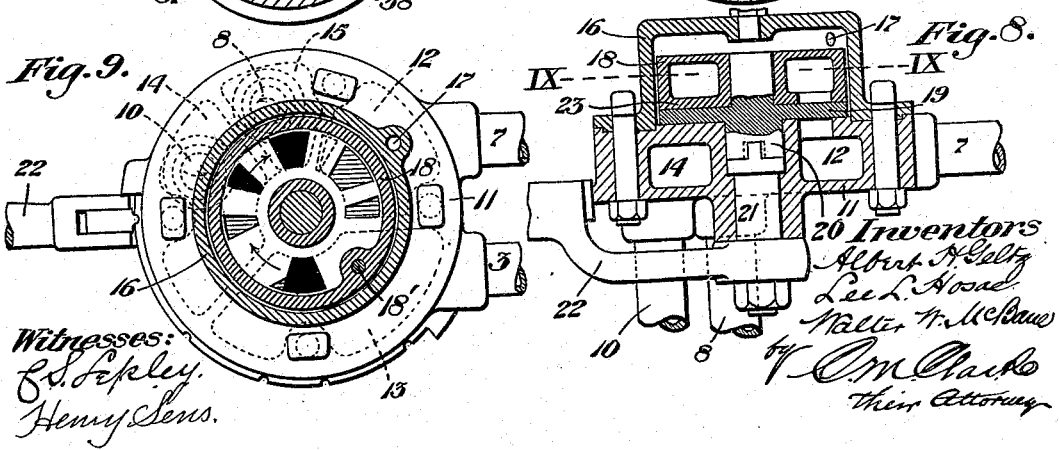

LEE L. HOSACK, OF YOUNGSTOWN, ALBERT H. GELTZ, OF ALLIANCE, AND WALTER W. McBANE, OF YOUNGSTOWN, OHIO, ASSIGNORS TO CHARLES B. McLEAN, TRUSTEE, OF PITTSBURG, PENNSYLVANIA.

AIR-BRAKE APPARATUS.

No. 930,379.      Specification of Letters Patent.      Patented Aug. 10, 1909.

Application filed May 19, 1908. Serial No. 433,669.

*To all whom it may concern:*

Be it known that we, LEE L. HOSACK, ALBERT H. GELTZ, and WALTER W. McBANE, citizens of the United States, residing at Youngstown, in the county of Mahoning, Alliance, in the county of Stark, and Youngstown, in the county of Mahoning and State of Ohio, respectively, have invented certain new and useful Improvements in Air-Brake Apparatus, of which the following is a specification, reference being had therein to the accompanying drawing.

Our invention refers to improvements in air brake apparatus and is designed to provide means whereby the locomotive brake cylinders and their operating valve mechanism may be rendered entirely cut off from operative connection with the triple valve of the automatic system and whereby the locomotive brake cylinders may also be operated in conjunction with the automatic system, in ordinary running.

The invention is dependent upon the use of our improved retaining valve and its connection with the straight air valve for the locomotive brake cylinders and with the said cylinders and the triple valve of the automatic system, and operates in manner hereinafter described.

In the accompanying drawings:—Figure 1 is a view in elevation showing the general arrangement of so much of an equipment as is necessary to illustrate the operation of the invention. Fig. 2 is a diagrammatic plan view of the straight air valve, in "full release" position. Fig. 3 is a similar view, partly in section, showing the valve in "service" position. Figs. 4 and 5 are vertical sectional views of the retaining valve in open and closed positions respectively. Fig. 6 is a horizontal sectional view on the line VI. VI. of Fig. 4. Fig. 7 is a similar view on the line VII. VII. of Fig. 5. Fig. 8 is a vertical sectional view of the straight air valve on the line VIII. VIII. of Fig. 2. Fig. 9 is a horizontal sectional view of said valve on the line IX. IX. of Fig. 8.

In the drawings A represents a straight air valve of any suitable construction, similar to that shown in our prior application filed December 6th, 1906 bearing the Serial No. 346,618, constructed and arranged to supply straight air pressure to the locomotive brake cylinders 2, 2, through pipe 3 leading to a supply port in valve A adapted in "service" and "emergency" positions to supply pressure through valve A from main or other reservoir 4 through connection 5, reducing valve 6 and pipe 7. Pressure is also held on the locomotive brake cylinders 2 in "lap" position and is exhausted therefrom in "full release" backwardly through connection 3 to valve A and through the registering ports therein to the atmosphere through pipe 8 or any suitable exhaust port leading thereto.

9 represents our improved retaining valve having connections at the top by pipe 10 with the straight air valve A so that in "lap" position pressure will be exerted through pipe 10 to the upper portion of the valve upon its movable piston, hereinafter described, and also in "service" or "emergency" positions, whereby to cut off connection from the locomotive brake cylinders to the triple valve.

One of the objects of the invention is to render the operation of the locomotive brake cylinders entirely independent of the triple valve but to render it also operative therewith and subject to supply of train pipe pressure from and exhaust backwardly through the triple valve in the ordinary operation of the automatic system.

The straight air valve A comprises a hollow base 11 having at one side a compartment 12 into which opens the pipe 7 from reservoir 4, a similar compartment 13 connected with pipe 3 leading to brake cylinder 2, and compartments 14, 15, communicating with pipe 10 leading to retaining valve 9 and pipe 8 leading to the atmosphere respectively. Above the base is an air-tight casing 16 through the wall of which leads a port 17 opening into the upper interior and maintaining uniform pressure therein on the upper stationary hollow disk 18. Said disk is retained stationary against rotation by any suitable means as a pin 181 connected with the top of casing 16.

The upper shell of hollow base 11 is faced as is also the lower face of disk 18 and between said faces is located the rotatable ported disk 19 connected by stem 20, 21, with operating handle 22 of well known construction. The lower base 23 of hollow disk 18 is provided with ports adapted to register through ports in rotatable disk 19 with supply compartment 12, exhaust compartment 13, retaining valve compartment 14 and exhaust compartment 15 respectively in varying positions of the rotatable disk 19, as shown by Figs. 3 and 9 to provide proper circulation of the air.

In "full release" position, (Fig. 9) the brake cylinders communicate with the atmosphere as does also the retaining valve pipe 10 as indicated by the blackened ports and arrows, all other ports being blanked. In "service" position (Fig. 3) the retaining valve is closed, cutting off communication between the triple valve and brake cylinders 2, pressure communicating from pipe 7 through ported disk 19 and from hollow interior of stationary disk 23 through ports in disk 19 to compartment 14 and pipe 10 and compartment 13 and pipe 3 respectively, as indicated by the blackened ports. The same circulation is maintained in "emergency" position the registering port areas being merely increased as will be readily understood.

Inasmuch as the straight air valve *per se*, is not a portion of the present invention, its complete construction and operation in the other positions, "running" and "lap" need not be further explained.

The retaining valve A is cylindrical in form and inclosed within an outer casing 24 having a normally open interior 25 connected by pipe 26 with pipe 3 of the brake cylinders 2 and by pipe 27 with supply port of triple valve B.

In the interior of retaining valve casing 24 is mounted a cylindrical valve 28 having at its upper end a pressure head 29 of any suitable form, but preferably having seats 29 and 30 adapted to bear in lowered and raised positions respectively on seats 31 of casing 24 and 32 of a closing cap 33. The lower end of casing 24 is closed by a cap 34, and between said cap 34 and the valve 28 is inserted a spring 35 which normally maintains the valve open, as in Fig. 4. As shown, the valve 28 is hollow upwardly within its shell and is provided with a central downwardly extending bearing 36 through which passes a bolt or stud 37 conveniently connecting the valve proper to its pressure head 29. The valve and head may however be made integral if desired, and rotation is prevented by a key or feather 38 or other suitable means adapted to maintain the valve in working position with relation to the ports leading to pipes 26 and 27.

C represents the ordinary engineer's valve connected with the main reservoir 4 and train pipe D in the usual way, and constituting with these and the other parts shown, portions of a standard equipment.

The operation is as follows: With the straight air valve in "full release" and "running" position, the retaining valve connection 10 is open to the atmosphere, so that an automatic application can be made to the brake cylinder 2. In "lap" position, after an application to the locomotive brake cylinders, either by the automatic or the straight air valve, the pressure will be retained in the locomotive brake cylinders and also in the retaining valve. When valve A is in "service" position, the port areas being partly opened, while in "lap" position with all ports blanked, the pressure is retained on both cylinders and retaining valve, holding the brakes set and absolutely closing communication to the triple, as stated. In releasing the pressure from cylinders 2 the air passes backwardly through pipe 3 to chamber 13 and up and down through ported valve 19 and hollow disk 18 to chamber 15 and exhaust pipe or opening 8 to the atmosphere. Likewise, pressure is released from the retaining valve 9 backwardly through pipe 10 to the atmosphere, but the ports are so arranged that all pressure is first released from the cylinders 2 before the retaining valve is released, whereby absolutely preventing the release of straight air pressure from the brake cylinders to the triple exhaust.

The advantages of the invention are that the locomotive brake cylinders are entirely cut off from any connection with the ordinary automatic system and the triple valve thereof and are capable of independent application and release without in any way employing or being dependent upon the exhaust of the triple valve. Also that the operation of the locomotive brake cylinders as a member of the automatic system is in no way interfered with, the connections from the brake cylinders through the retaining valve 9 to the triple being entirely open when the straight air apparatus is not operating. Also, application of the automatic system to the locomotive brake cylinders is entirely prevented when the straight air system is in use and the operation of the straight air prevented when the automatic is in use on the locomotive brake cylinders. Also, that the pressure can be retained in the locomotive brake cylinders without in any way interfering with the operation of the automatic system by our retaining valve, and while returning the automatic system to release position. A further advantage is that the engine brakes can be released without interfering with the automatic system; that due to the reduced pressure from the main reservoir through the reducing valve, and the cut-off of the connection with the automatic system by the retaining valve, thereby obviating the necessity of utilizing full train line pressure for the locomotive brakes as is the practice in the ordinary operation of the automatic system, skidding of the engine wheels is prevented, while still allowing the application of full train pipe pressure in automatic operation, while the straight air brake valve is not in use.

In double-heading with the automatic brake valve cut out the engineer of the second engine can release his brakes or prevent the same from being set, applied, or retained by the straight air valve. The engineer's valve of the second engine in practice, being cut out, facilitates operation of the first engine with the straight air valve in "full release" position while the brakes on the second locomotive would not apply with a reduction in the train line, or the engineer on the second engine can allow the first and second reduction to the brake cylinders and block the third by moving the straight air valve to "lap" position.

The use of our retaining valve prevents or overcomes the effect of the usual defects of the triple, so that blowing out through the triple exhaust in application position or in any position, thereby resulting in setting the brakes, is obviated. Also, when the locomotive brake cylinders are connected directly to the triple exhaust the full train line pressure is sent to the brake cylinders, while with our improvement any desired pressure for the brake cylinders is secured by means of the reducing valve interposed between the main or other reservoir and the straight air valves. It is thus impossible to get more than one pressure at any time, while without our retaining valve it becomes possible to apply reservoir pressure and also train line pressure through the triple, but the retaining valve renders it impossible to apply automatic pressure until the locomotive brake cylinders are first exhausted and the retaining valve released. Then, as stated, the brake cylinders become operable by the automatic equipment.

What we claim is:

1. The combination with a reservoir, a locomotive brake cylinder, and a triple valve; of means adapted to open or close communication from the triple valve to the brake cylinder, and unitary means adapted to control said means and having a separate connection to furnish reservoir pressure to the locomotive brake cylinder.

2. The combination with a reservoir, a locomotive brake cylinder, and a triple valve; of means connecting the triple valve with the brake cylinder, means adapted to open or close communication therethrough from the triple valve to the brake cylinder, and means connected with the reservoir and brake cylinder adapted to control said opening and closing means and separately connected with the locomotive brake cylinder as to furnish reservoir pressure directly thereto.

3. The combination with a reservoir, a locomotive brake cylinder, and a triple valve; of means connecting the triple valve with the brake cylinder, means adapted to open or close communication therethrough from the triple valve to the brake cylinder, and means connected with the reservoir and brake cylinder adapted to control said opening and closing means and separately connected with the locomotive brake cylinder as to furnish reservoir pressure directly thereto, and to exhaust therefrom.

4. The combination with a supply pipe leading directly to a locomotive brake cylinder and means connecting said pipe laterally with a triple valve; of means controlling the circulation between the triple valve and brake cylinder through such lateral connection and means for actuating said controlling means and for controlling the pressure to the brake cylinder through the supply pipe.

5. The combination with a supply pipe leading directly to a locomotive brake cylinder and means connecting said pipe laterally with a triple valve; of means controlling the circulation between the triple valve and brake cylinder through such lateral connection and means for actuating said controlling means and for controlling the pressure to and exhaust from the brake cylinder.

6. The combination of a reservoir, a locomotive brake cylinder, its supply pipe, and a triple valve; of a pressure retaining controlling valve connected with the triple valve and brake cylinder supply pipe and a straight air valve connected by independent pipes with the reservoir, brake cylinder supply pipe, and controlling valve.

7. The combination of a reservoir, a locomotive brake cylinder, its supply pipe, and a triple valve; of a pressure retaining controlling valve connected with the triple valve and brake cylinder supply pipe, and a straight air valve connected by independent pipes with the reservoir, brake cylinder supply pipe, and controlling valve, and having an outlet port to the atmosphere.

8. In an air brake system, the combination of an engineer's valve, a brake cylinder and its triple valve, piping connecting these parts, a pressure retaining controlling valve between the brake cylinder and the triple valve, and brake control valve mechanism connected to the brake cylinder and having a separate connection with the controlling valve adapted to control the circulation between the triple valve and the brake cylinder.

9. In an air brake system, the combination of an engineer's valve, a brake cylinder and its triple valve, piping connecting these parts, a pressure retaining controlling valve between the brake cylinder and the triple valve, and brake control valve mechanism connected by independent pipes to the brake cylinder and controlling valve adapted to control the circulation between the triple valve and the brake cylinder and to control the supply of pressure to the brake cylinder respectively.

10. In an air brake system, the combination of an engineer's valve, a brake cylinder and its triple valve, piping connecting these parts, a pressure retaining controlling valve between the brake cylinder and the triple valve, and brake control valve mechanism connected by independent pipes to the brake cylinder and controlling valve adapted to control the circulation between the triple valve and the brake cylinder and to control the supply of pressure to the brake cylinder and exhaust therefrom respectively.

11. In an air brake system, the combination of an engineer's valve, a brake cylinder and its triple valve, piping connecting these parts, a pressure retaining-controlling valve between the brake cylinder and the triple valve, a reservoir, and valve mechanism directly connected with the reservoir, brake cylinder and controlling valve.

12. In an air brake system, the combination of an engineer's valve, a brake cylinder and its triple valve, piping connecting these parts, a pressure retaining-controlling valve between the brake cylinder and the triple valve, a reservoir, and valve mechanism connected with the controlling valve, brake cylinder, and reservoir, and embodying an intervening reducing valve between said valve mechanism and the reservoir.

In testimony whereof we affix our signatures in presence of two witnesses.

LEE L. HOSACK.
  ALBERT H. GELTZ.
  WALTER W. McBANE.

Witnesses to signatures of Lee L. Hosack and Walter W. McBane:
 CHAS. E. SEMPLE,
 OLIVE RINEHART.

Witnesses to signature of Albert H. Geltz:
 C. M. CLARKE,
 CHAS. S. LEPLEY.